(12) United States Patent
Arthur et al.

(10) Patent No.: US 9,221,632 B2
(45) Date of Patent: Dec. 29, 2015

(54) MEDIA CASSETTE LOADER

(75) Inventors: Gardiner Arthur, Broughty Ferry (GB); Nicholas Cooke, St. Andrews (GB)

(73) Assignee: NCR Corporation, Duluth, GA (US)

( * ) Notice: Subject to any disclaimer, the term of this patent is extended or adjusted under 35 U.S.C. 154(b) by 395 days.

(21) Appl. No.: 13/435,905

(22) Filed: Mar. 30, 2012

(65) Prior Publication Data
US 2013/0259637 A1 Oct. 3, 2013

(51) Int. Cl.
G07F 7/04 (2006.01)
B65H 1/26 (2006.01)
G07D 11/00 (2006.01)
G07F 19/00 (2006.01)

(52) U.S. Cl.
CPC ............ B65H 1/266 (2013.01); G07D 11/0006 (2013.01); G07F 19/201 (2013.01); B65H 2402/62 (2013.01); B65H 2405/20 (2013.01); B65H 2601/322 (2013.01); B65H 2701/1912 (2013.01)

(58) Field of Classification Search
CPC .......... G07D 11/0006; G07D 11/0009; G07D 11/0012; G07D 11/0015; G07F 19/20; G07F 19/201; G07F 19/202
USPC ..................... 902/13; 206/821; 271/145, 162; 194/206, 207; 209/534, 584, 900; 382/135; 108/143; 248/444, 694, 146, 248/148, 346.02
See application file for complete search history.

(56) References Cited

U.S. PATENT DOCUMENTS

| | | | | |
|---|---|---|---|---|
| 3,145,870 A | * | 8/1964 | Lockwood | .................. 220/4.24 |
| 4,441,451 A | * | 4/1984 | Neal | .............................. 119/168 |
| 5,871,209 A | * | 2/1999 | Orchard et al. | ............... 271/149 |
| 6,648,284 B2 | * | 11/2003 | Caporali et al. | ............ 248/188.2 |
| 2003/0047601 A1 | * | 3/2003 | Nomiyama et al. | .......... 235/381 |
| 2005/0000042 A1 | * | 1/2005 | Marko et al. | ................... 14/69.5 |
| 2006/0225581 A1 | * | 10/2006 | Barber | ............................. 99/426 |
| 2009/0218258 A1 | * | 9/2009 | Wakamiya et al. | ........... 209/539 |

* cited by examiner

*Primary Examiner* — Jeffrey Shapiro
(74) *Attorney, Agent, or Firm* — Joseph P. Mehrle

(57) ABSTRACT

A media cassette loader is described. The media cassette loader comprises a base; a media loading surface inclined at an angle to the base; and an end wall upstanding from a lower end of the media loading surface. The end wall supports media items stacked on the media loading surface. The media loading surface and the end wall are dimensioned to be accommodated within a media cassette body. This allows the media cassette body to be placed over the media loading surface when stacked with media items so that the cassette body surrounds the stacked media items.

14 Claims, 6 Drawing Sheets

MEDIA CASSETTE LOADER

FIELD OF INVENTION

The present invention relates to improvements in, or relating to, a media cassette loader.

BACKGROUND OF INVENTION

Media cassettes are used in self-service terminals (SSTs), such as automated teller machines (ATMs). ATMs use media cassettes for a variety of different types of media. However, the most common use of an ATM media cassette is for storing currency (in the form of banknotes) in a manner that allows the currency to be removed, one banknote at a time, from the media cassette (referred to as a currency cassette). The currency is typically stored as a horizontal stack within the currency cassette.

To enable the stored banknotes to be removed reliably, the currency cassette includes a pusher plate that urges the horizontal stack towards a picking area. When the currency cassette is empty (or nearly empty), it can be manually replenished by removing a lid, retracting the pusher plate, and inserting a new horizontal stack of banknotes between the picking area and the pusher plate.

There are a number of problems associated with replenishing currency cassettes.

One problem associated with replenishing currency cassettes is that the cassette side-walls restrict easy entry of a replenisher's hands, particularly when the replenisher is holding a bunch of banknotes.

Another problem associated with replenishing currency cassettes is that a replenisher may insert too many banknotes (referred to as overstuffing). This is possible because banknotes in the cassette can be compressed by the replenisher once they are inserted, thereby allowing more banknotes to be inserted. Overstuffing can cause excessive force on the banknote nearest the picking area, which can result in failed picking (no banknote picked) or multiple picking (more than one banknote picked in a single picking operation). Neither of these pick operations is desirable.

Another problem is that when a replenisher inserts banknotes into the currency cassette individual banknotes may be incorrectly inserted, for example, a banknote may be partially folded and the next banknote may be placed on the folded portion of the banknote. This may also result in pick failures during operation of an ATM into which the currency cassette is inserted.

Another problem associated with replenishing currency cassettes is that there is a risk of minor injury. For example, a replenisher may lock the pusher plate at a fully-retracted position and then place banknotes into the space between the pusher plate and the picking area using his/her hands. If the pusher plate is accidentally released (or if a catch holding the pusher plate in place fails) then the pusher plate may impact the replenisher's hand. Although this is unlikely to cause any serious injury, it may result in some discomfort.

SUMMARY OF INVENTION

Accordingly, the invention generally provides methods and apparatus for a media cassette loader comprising: a base, a media loading surface, and an end wall upstanding from one end of the media loading surface to support media items stacked thereon, the media loading surface and end wall being dimensioned to be accommodated within a media cassette.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media cassette loader comprising: a base; a media loading surface inclined at an angle to the base; and an end wall upstanding from a lower end of the media loading surface to support media items stacked on the media loading surface, the media loading surface and the end wall being dimensioned to be accommodated within a media cassette body; thereby allowing the media cassette body to be placed over the media loading surface when the media loading surface is stacked with media items so that the cassette body surrounds the stacked media items.

This allows the media cassette body to be replenished by rotating the combined media loader and media cassette body until the media loader is upside down (and the media cassette body is the right way round), then removing the media cassette loader to leave the stacked media items within the cassette body. A media cassette lid may then be placed over the media cassette body to close the media cassette.

The media cassette body may further comprise a (first) side-wall upstanding from the media loading surface. The first side-wall may include an upper portion parallel to the media loading surface so that the distance between the media loading surface and the top of the upper portion is constant along the entire length of the media loading surface. The first side-wall may have a height approximately equal to the height of media items (such as banknotes) to be stacked on the media loading surface.

The upper portion may be dimensioned to locate between a side-wall of the media cassette body and a media width guide within the media cassette body.

Preferably, the media cassette loader is open above the media loading surface on an opposing side to the first side-wall. In other words, in preferred embodiments, the media cassette does not define a side-wall opposite the first side-wall. This is to allow a replenisher to gain easy access to the media loading surface without being obstructed by a second side-wall. However, in some embodiments it may be desirable that the media cassette body may further comprise a second side-wall upstanding from the media loading surface at an opposite side to the first side-wall. The second side-wall may be lower in height than the first side-wall to allow a replenisher to access the media loading surface from above the second side-wall.

The end wall may be disposed at an acute angle to the media loading surface.

The media cassette loader may comprise a second end wall opposite the first end wall. The second end wall may be relatively low compared with the first end wall.

The media loading surface and the end wall(s) may be dimensioned so that even if the media loader is overstuffed with media items, a sufficient gap is provided within the cassette body so that the overstuffing condition is reduced or obviated once the cassette media loader is removed.

The media cassette may be a currency cassette for storing banknotes.

The media cassette loader may further comprise a pair of support handles disposed on each of two opposing sides of the media cassette loader. The support handles may be located such that when a media cassette body is placed over the media loading surface, the support handles abut to upper edges on longitudinal sides of the media cassette. This allows a replenisher to hold the media cassette and media cassette loader combination together by placing fingers of his/her hand on a base of the media cassette body and a thumb of his/her hand on one of the support handles and pushing his/her fingers and thumb on each hand together.

Another advantage of the support handles is that they provide a visual indication to the replenisher that the media cassette has been correctly positioned over the media cassette loader because the support handles should be parallel to the upper edges on the longitudinal sides of the media cassette.

The media loading surface may define a central groove extending longitudinally therealong so that media items are located transversely to the central groove as they are stacked on the media loading surface. This has the advantage that if an elastic band or loop of paper is used to group bunches of media items near the center of the media items, then the bunches of media items can be placed on the media loading surface as bunches (that is, without first removing the elastic band or loop of paper) to facilitate stacking. The loops of paper or elastic bands will be located within the central groove so they will not raise the bunch of media items. The loops of paper or elastic bands can be snipped, either before placing the media cassette body over the media cassette loader, or after removing the media cassette loader from the media cassette body.

Once the media cassette body has been placed over the media cassette loader, the combination has been flipped over, and the media cassette body has been removed, the snipped loops of paper or elastic bands can be removed by lifting them vertically.

Another advantage of the central groove is that it minimizes, or at least reduces, any damage to the media items if the elastic bands or loops of paper are cut and removed when the media items are resting on the media loading surface.

The media loading surface may be inclined at an angle in one plane or in two planes. A suitable angle may be within the range of approximately five degrees to approximately forty degrees to the horizontal. For banknotes, an advantageous angle may be within the range of approximately ten degrees to approximately twenty-five degrees to the horizontal.

Locating guides may be provided on each of the two opposing sides of the media cassette loader. The locating guides may assist in registering the media cassette body over the media cassette loader.

The media cassette loader may define a removal handle within the base to facilitate removal of the media cassette loader from the media cassette.

Locating guides may also be provided on the lower end wall to assist in registering the media cassette body over the media cassette loader.

In some embodiments, the upper portion of the first sidewall may comprise a U-shaped profile. The U-shaped profile may be dimensioned to accommodate a media width guide located within the media cassette body, so that when the media cassette body is located over the media cassette loader, the media width guide is located within a recess in the U-shaped profile.

A blanking box may be provided for use by a replenisher in stacking on the media loading surface so that the entire media loading surface does not need to be stacked with media items. This may be useful if a replenisher only wants to partially fill a media cassette. The blanking box may have a height and width corresponding to the height and width of the media items being stacked. Once the media cassette has been replenished, the blanking box can be removed to leave the media cassette only partially full.

According to a second aspect there is provided a method of loading a media cassette, the method comprising: placing a stack of media items on a media loading surface inclined at an angle to a base; placing a media cassette body over the media loading surface stacked with media items so that the cassette body surrounds the stacked media items; rotating the combined media loader and media cassette body until the media loader is upside down and the media cassette body is the right way round; and removing the media cassette loader to leave the stacked media items within the cassette body.

The method may comprise the further step of securing a media cassette lid over the media cassette body.

The media items may comprise banknotes.

It should now be appreciated that these aspects have the advantage that a replenisher can stack media items onto a media cassette loader. Once a neat stack has been created, the replenisher can then place an empty currency cassette body (with the pusher plate retracted) over the media cassette loader, then rotate that combined loader and cassette body, then remove the media cassette loader. Any media items that were inserted over a curled (or folded) portion of another media item will be apparent because the curled (or folded) media item will protrude from the stack of media items because the curled portion is no longer restrained by the media loading surface.

These and other aspects will be apparent from the following specific description, given by way of example, with reference to the accompanying drawings.

DETAILED DESCRIPTION

Figure 1:
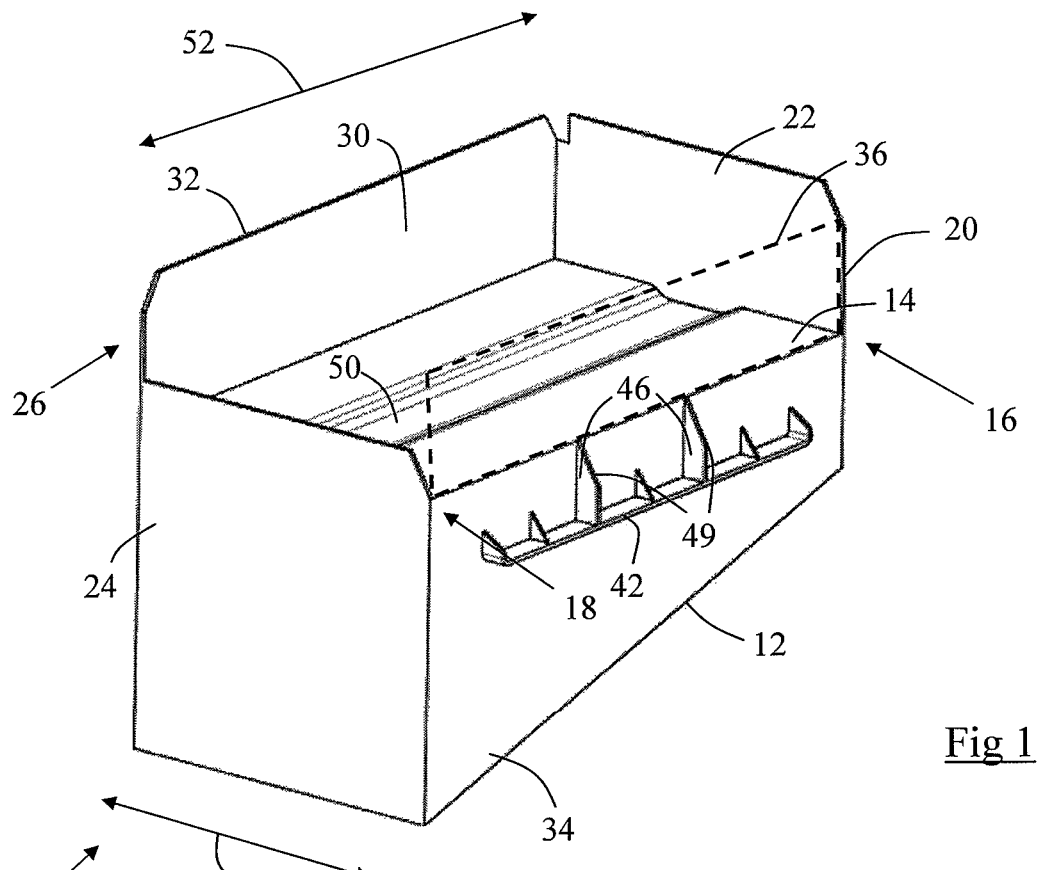
FIG. 1 is a perspective diagram of a media cassette loader in the form of a currency cassette loader according to one embodiment of the present invention.
Figure 2:
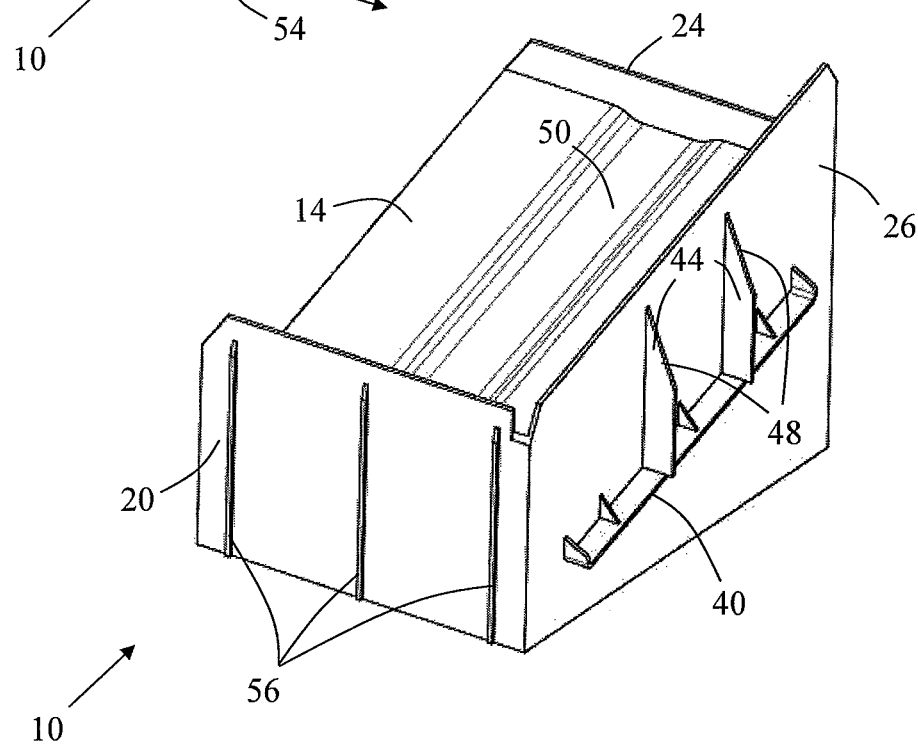
FIG. 2 is a perspective diagram of the currency cassette loader of FIG. 1 viewed from the opposite side.

Reference is first made to FIGS. 1 and 2, which are simplified schematic perspective diagrams of a media cassette loader 10 in the form of a currency cassette loader according to one embodiment of the present invention.

The currency cassette loader 10 comprises a unitary injection-molded part. The currency cassette loader 10 defines a base 12 (in the form of a generally horizontal platform) and a media loading surface 14 (in the form of a banknote loading surface) inclined in one plane at an angle of approximately seventeen degrees to the base 12. The media loading surface 14 extends from a lower end 16 to an upper end 18.

A lower (or first) end wall 20 extends from the base 12 above the banknote loading surface 14 to provide a banknote detent surface 22 against which banknotes placed on the banknote loading surface 14 can rest.

An upper (or second) end wall 24 is located at an opposite end of the base 12 to the lower end wall 20 and extends above the banknote loading surface 14 by a small amount (approximately 2.5 cm in this embodiment).

The currency cassette loader 10 further defines a first side-wall 26 extending longitudinally from the lower end wall 20 to the upper end wall 24 and upwards from the base 12 to above the banknote loading surface 14. The part of the side-wall 26 extending above the banknote loading surface 14 is referred to as an upper portion 30. The upper portion 30 includes a top surface 32. The distance between the top surface 32 and the banknote loading surface 14 is constant along the entire length of the upper portion 30 and is approximately the same as a height of a U.S. ten dollar banknote.

The currency cassette loader 10 also defines a second side-wall 34 extending longitudinally from the lower end wall 20 to the upper end wall 24 and upwards from the base 12 to the level of the banknote loading surface 14. The second side-wall 34 does not protrude above the banknote loading surface 14, thereby providing a replenisher with unrestricted access to the banknote loading surface 14 from the second side-wall side via an open area 36 (illustrated by broken lines in FIG. 1).

The currency cassette loader 10 further defines a pair of support handles 40,42 located on opposite longitudinal sides thereof. Each support handle 40,42 extends parallel to the banknote loading surface 14. The first support handle 40 includes first locating guides 44 in the form of guiding ribs (best seen in FIG. 2) extending transversely to the support handle 40 and along an outer surface of the side-wall 26. The second support handle 42 includes second locating guides 46 in the form of guiding ribs (best seen in FIG. 1) extending transversely to the support handle 42 and along an outer surface of the side-wall 34. Each set of guiding ribs 44,46 includes a profiled surface 48,49 (tapering from high to low as the guiding ribs extend away from the base 12) to guide a currency cassette body during placement thereof, as will be described in more detail below.

The currency cassette loader 10 further defines a central groove 50 (approximately 5 mm deep) in the banknote loading surface 14 extending longitudinally therealong so that media items are located transversely to the central groove 50 as they are stacked on the banknote loading surface 14.

In this embodiment, the currency cassette loader 10 has a length 52 of approximately 295 mm and a width 54 of approximately 160 mm. These dimensions were selected to match a conventional currency cassette sold by NCR Corporation, 3097 Satellite Blvd., Duluth, Ga. 30096, U.S.A.

The lower end wall 20 also defines locating guides 56 in the form of profiled guide strips. These profiled guide strips 56 assist in registering a currency cassette body during placement thereof, as will be described in more detail below.

Figure 3:
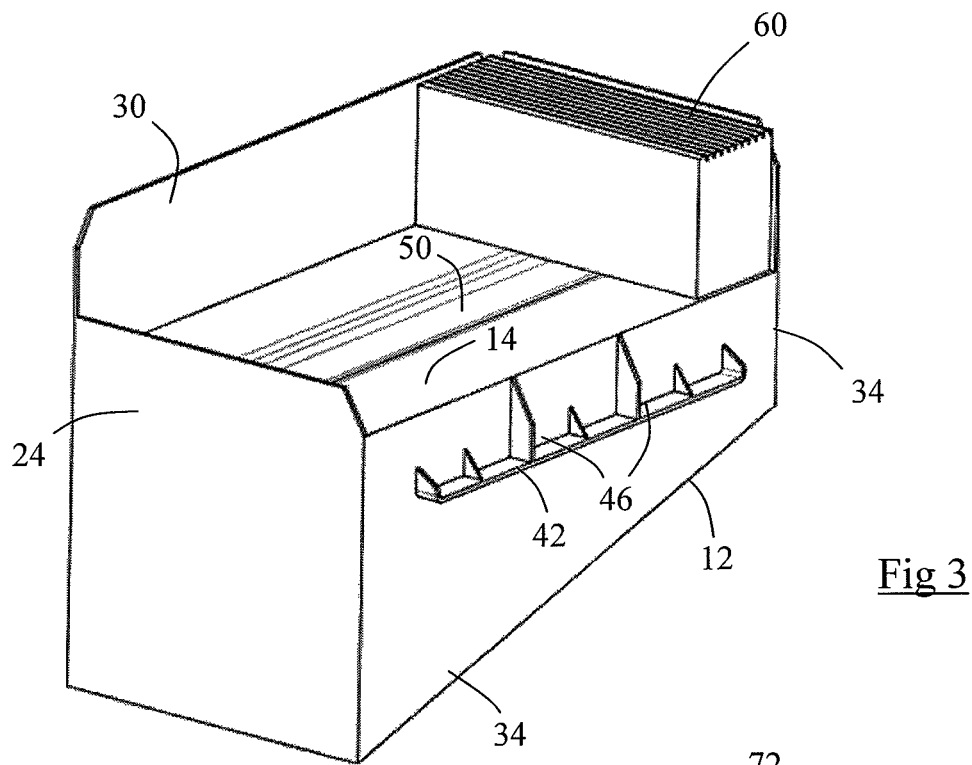
FIG. 3 is a perspective diagram of the cassette loader of FIG. 1 including some media items (banknotes) stacked thereon.

Reference will now also be made to FIG. 3, which is a perspective diagram of the currency cassette loader 10 including a plurality of banknotes 60 stacked neatly thereon.

As is evident from FIG. 3, a replenisher can easily place banknotes 60 on the banknote loading surface 14 by placing his/her hand through the open area 36. Once banknotes have been placed on the banknote loading surface 14 from the lower end wall 20 to the upper end wall 24 then the currency cassette loader 10 is ready for use.

Figure 4:
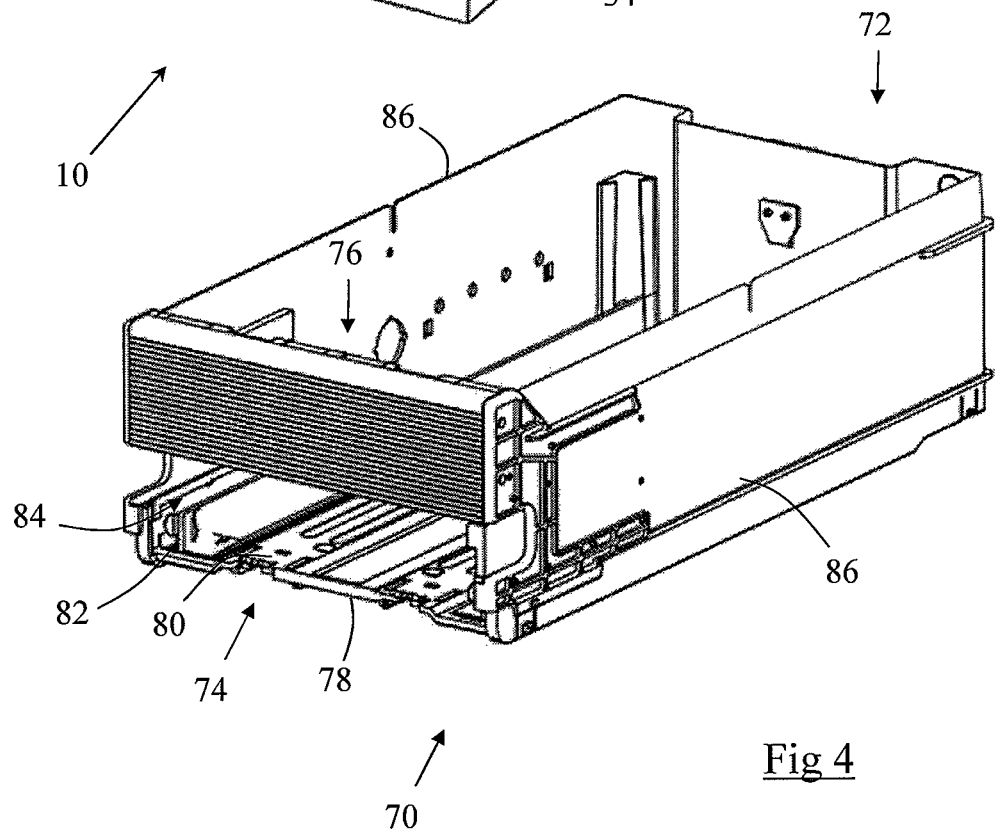
FIG. 4 is a perspective diagram of a body portion of a currency cassette (parts of which have been removed for increased clarity) for replenishing by the cassette loader of FIG. 1.

Reference will now also be made to FIG. 4, which is a simplified schematic diagram of a body portion 70 of a currency cassette for replenishing by the currency cassette loader 10.

The currency cassette body portion 70 is made from polycarbonate and includes a handle end 72 (a "non-picking end"), and a closeable pick window 74 (or media removal window) at the opposite end 76 (a "picking end").

The cassette body portion 70 includes a base 78 and a raised floor 80 located above the base 78. A ratchet rack (not shown) is centrally mounted between the base 78 and the raised floor 80. The ratchet rack (not shown) extends in a longitudinal direction from the handle end 72 to the picking end 76.

A pusher plate (not shown) is mounted over the ratchet rack (not shown) and biased towards the picking end 76 by a coil spring (not shown, but also located between the base 78 and the raised floor 80). The pusher plate (not shown) urges a stack of banknotes 60 towards the pick window 74, so that when the pick window 74 is open, banknotes can be picked through the pick window 74 by a currency dispenser.

The cassette body portion 70 also includes a pair of banknote width guides 82 (only one of which is visible in FIG. 4) mounted on the floor 80 of the cassette body portion 70. These banknote width guides 82 are spaced apart to define an area therebetween that allows U.S. banknotes to be accommodated without allowing significant lateral movement of the banknotes. These banknote width guides 82 are adjustable (they can be moved relative to the floor 80) to accommodate different sizes of currencies.

Each of the banknote width guides 82 defines a channel 84 between a nearest longitudinal side-wall 86 of the cassette body 70 and that banknote width guide 82.

The currency cassette body portion 70 defines an internal length of approximately 296 mm and an internal width of approximately 161 mm. The channel 84 has a width of approximately 11 mm.

The banknote loading process will now be described with reference to FIGS. 5 to 10.

Figure 5:
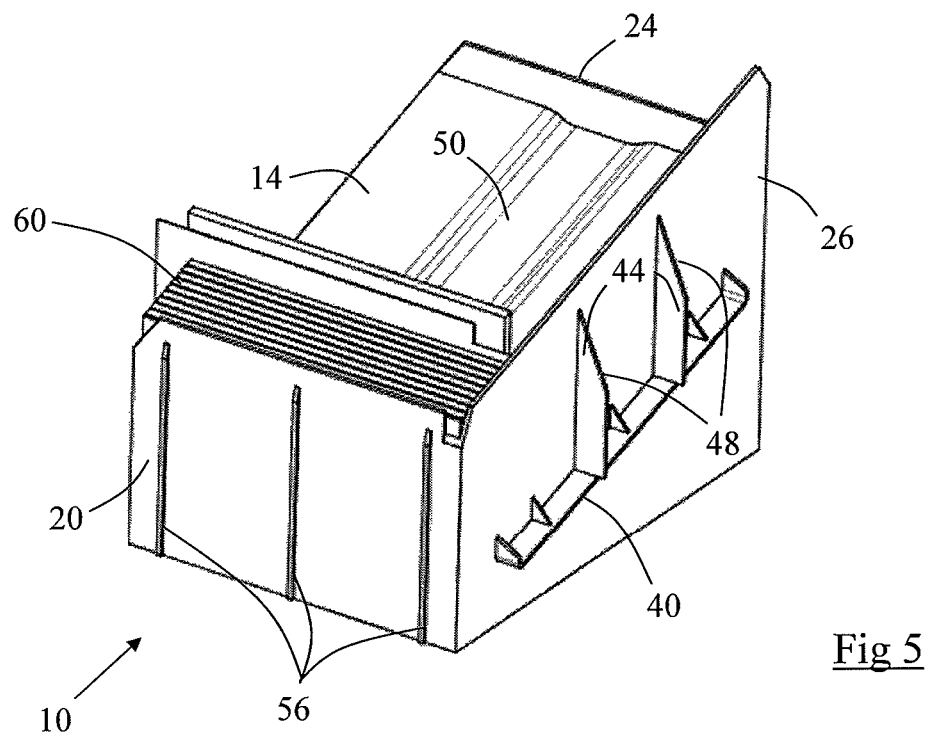
FIG. 5 is a perspective diagram illustrating the cassette loader of FIG. 3, viewed from the opposite direction, and partially stacked with banknotes.
Figure 6:
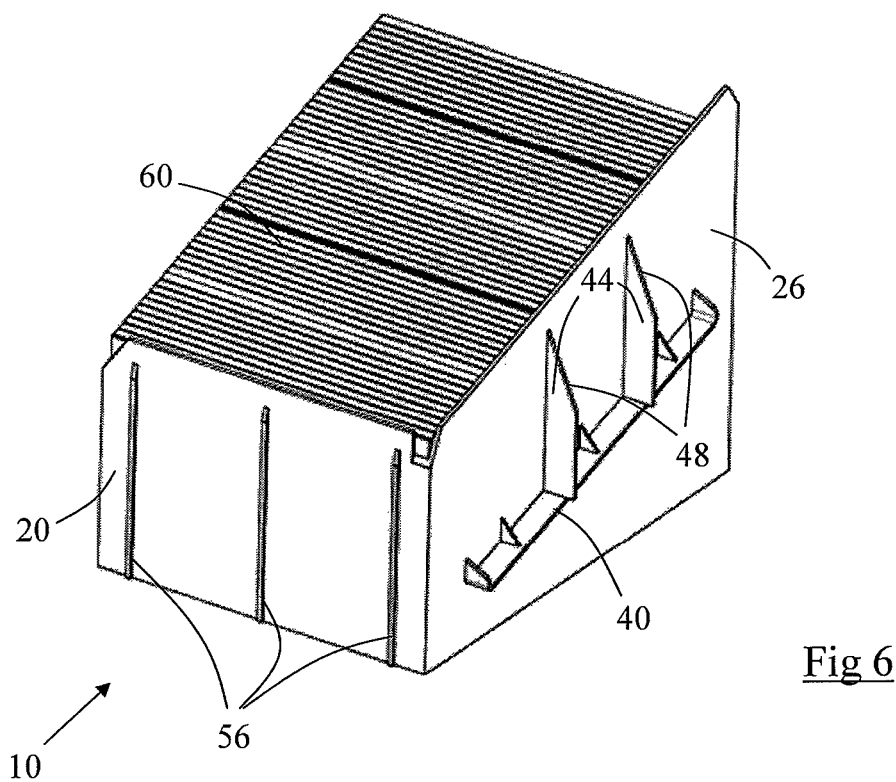
FIG. 6 is a perspective diagram illustrating the cassette loader of FIG. 5 fully stacked with banknotes.

FIG. 5 and FIG. 6 are perspective diagrams (from an opposite direction to that of FIG. 3) of the currency cassette loader 10 including a partial (FIG. 5) and complete (FIG. 6) stack of banknotes 60.

Figure 7:
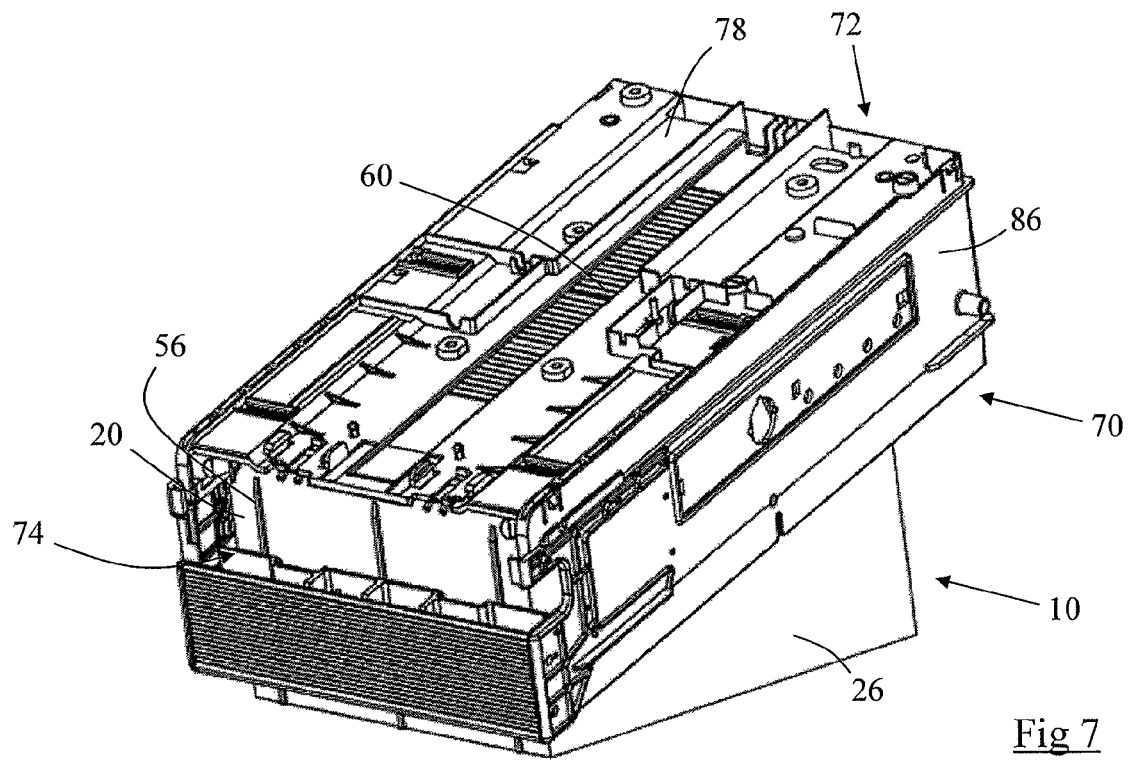
FIG. 7 is a perspective diagram illustrating the currency cassette body portion of FIG. 4 placed over and partially enclosing the cassette loader of FIG. 6 to form a combined unit.

Once a complete stack 60 has been loaded, the currency cassette body portion 70 can be inverted (after the pusher plate has been locked in a fully retracted position) and placed over the stacked currency cassette loader 10 to create a combined loading unit 100, as shown in FIG. 7. In the combined loading unit 100, the cassette body portion 70 partially encloses the currency cassette loader 10.

While the currency cassette body portion 70 is being lowered over the stacked currency cassette loader 10, the guiding ribs 44,46 on each side of the currency cassette loader 10 serve to align the currency cassette body portion 70 to the currency cassette loader 10 in a lateral direction. Similarly, the end wall 20 and the upper portion 30 serve to locate the currency cassette body portion 70 correctly with respect to the currency cassette loader 10 in the longitudinal direction.

The banknote loading surface 14 and end wall 20 are dimensioned to be accommodated within the currency cassette body portion 70. Furthermore, the upper portion 30 is dimensioned to locate between one of longitudinal side-walls 86 of the cassette body 70 and the respective banknote width guide 82.

The banknote loading surface 14 and the end walls 20,24 are dimensioned so that even if the currency cassette loader 10 has too many banknotes placed thereon, a sufficient gap is provided within the cassette body so that the overstuffing condition is reduced or obviated once the currency cassette loader 10 is removed.

Figure 8:
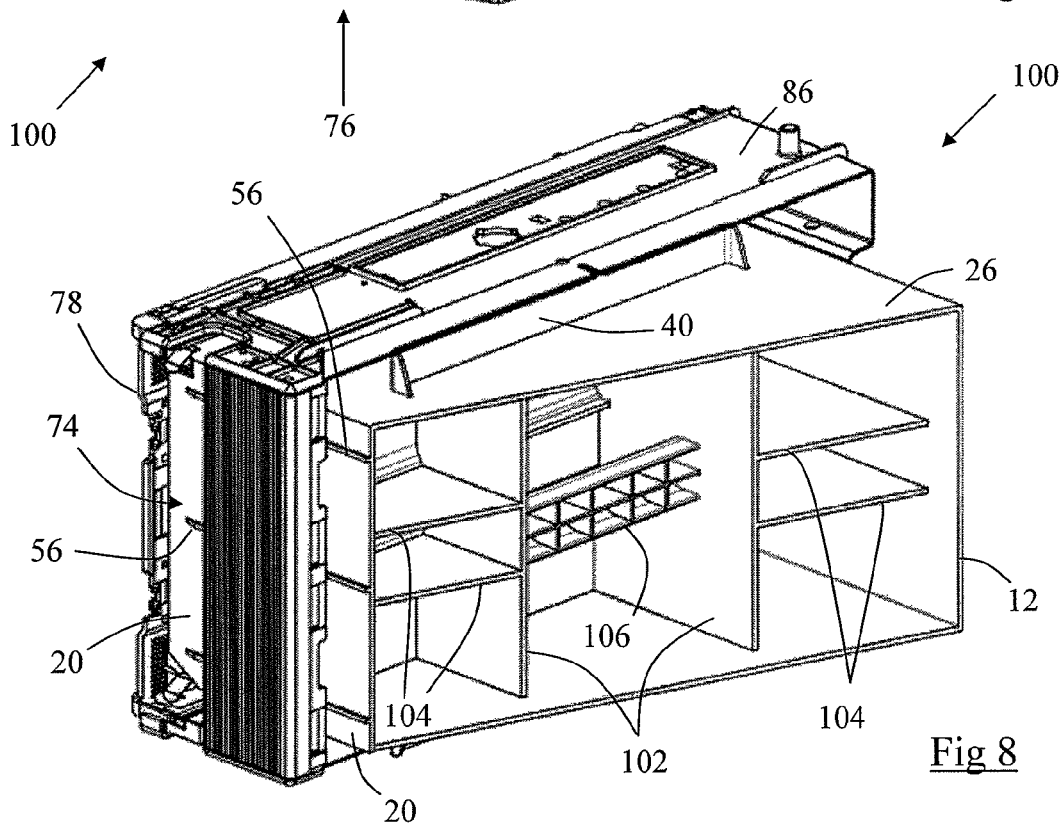
FIG. 8 is a perspective diagram illustrating the combined unit of FIG. 7 rotated by ninety degrees.
Figure 9:
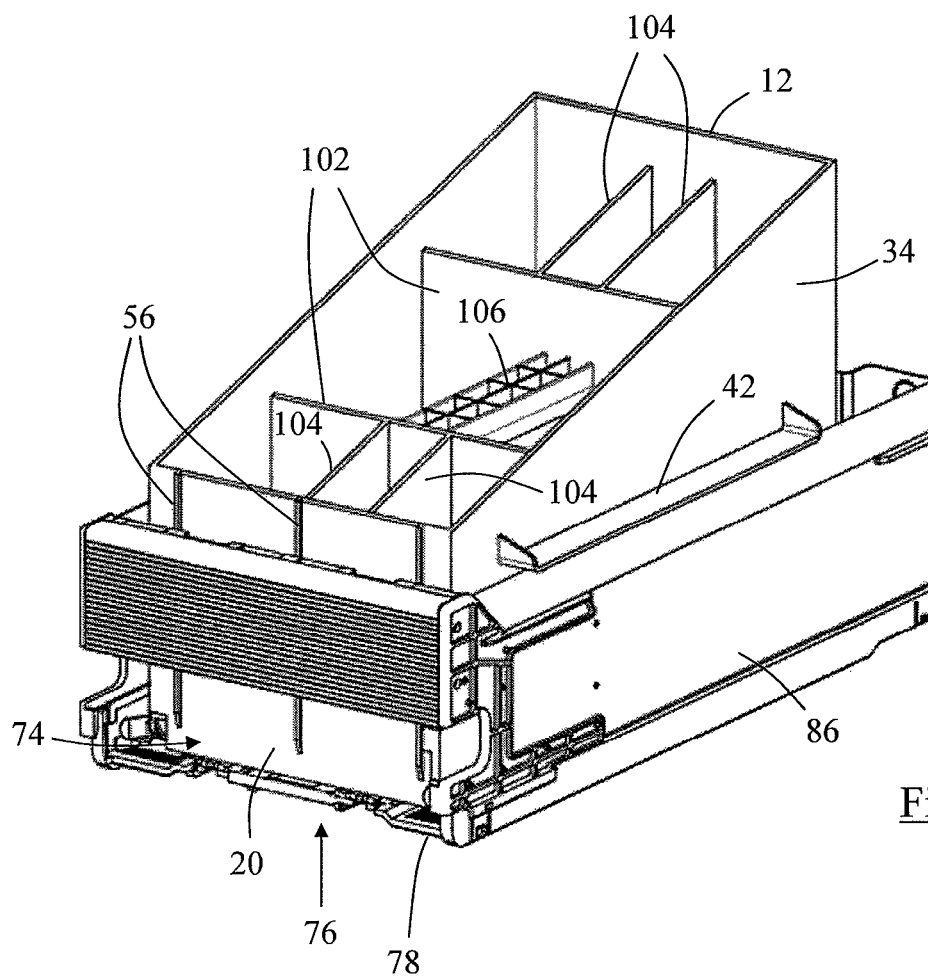
FIG. 9 is a perspective diagram illustrating the combined unit of FIG. 8 rotated by a further ninety degrees.
Figure 10:
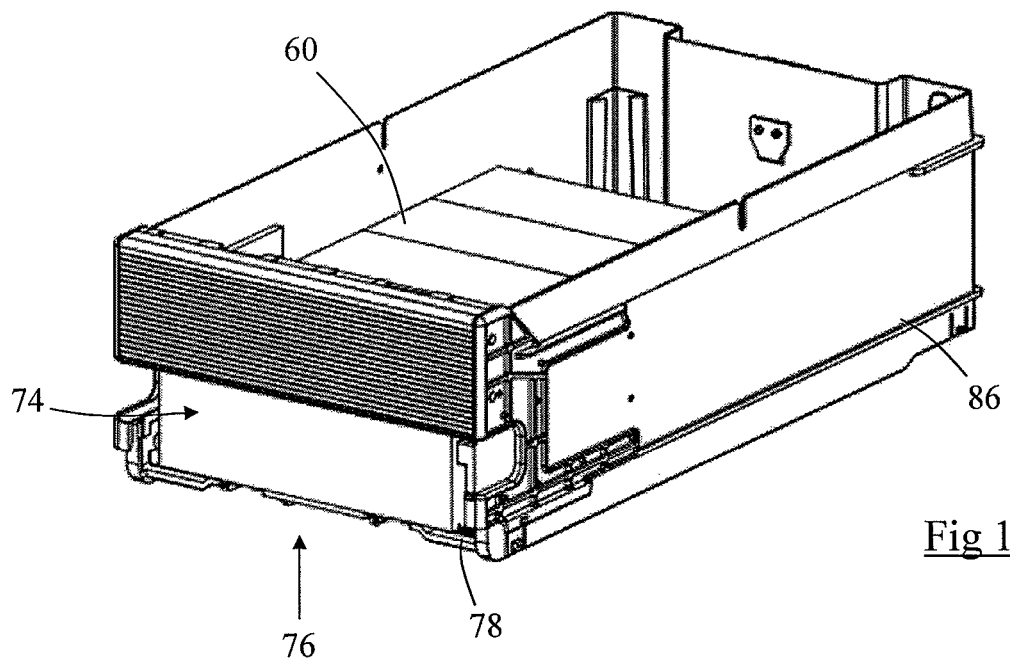
FIG. 10 is a perspective diagram illustrating the currency cassette body portion after the cassette loader has been removed therefrom.

The combined unit 100 can then be rotated to a position shown in FIG. 8, and further rotated to a position shown in FIG. 9, until the combined unit 100 is resting on the base 78 of the currency cassette body portion 70 (which is the correct way round for the currency cassette body portion 70). As can be seen from FIG. 8, the base 12 of the currency cassette loader 10 is hollowed out and there are two internal lateral walls 102 and four internal longitudinal walls 104 to provide rigidity. The base 12 also defines a removal handle 106 to enable a replenisher to disengage the currency cassette loader 10 from the currency cassette body portion 70.

To aid a replenisher in maintaining the combined unit 100 together while the combined unit 100 is being rotated, the replenisher can exert pressure between the support handles 40,42 and the cassette base 78.

Once the combined unit 100 is fully rotated, the currency cassette loader 10 can then be removed from the currency cassette body portion 70 to leave the currency cassette body portion 70 fully replenished with banknotes. This is easily accomplished by the replenisher exerting vertical force via the removal handle 106.

A replenisher can then manually adjust any banknotes that are sitting proud of the stack (by tapping them down gently), and/or snip and remove any elastic bands or paper loops that are still around groups of banknotes.

Once the replenisher is satisfied that the banknotes are correctly located within the currency cassette body portion 70, then he/she can unlatch the pusher plate (not shown) to secure the banknotes 60 between the pusher plate (not shown) and the picking end 76.

The replenisher can then place a currency cassette lid (not shown) on the currency cassette body portion 70. The currency cassette is now replenished and ready for use.

The currency cassette loader 10 of this embodiment is designed to be used in two different orientations. In FIG. 7, the currency cassette body portion 70 was placed over the stacked currency cassette loader 10 with the picking end 76 nearest the lower end wall 20. However, the currency cassette body portion 70 can also be placed over the currency cassette body portion 70 in the opposite orientation; that is, with the picking end 76 nearest the upper end wall 24. This has the advantage that a replenisher does not have to check the orientation of the currency cassette body portion 70 before placing it over the currency cassette loader 10, thereby reducing the possibility of human error.

It should now be appreciated that this embodiment provides an improved mechanism for replenishing currency cassettes.

Figure 11:
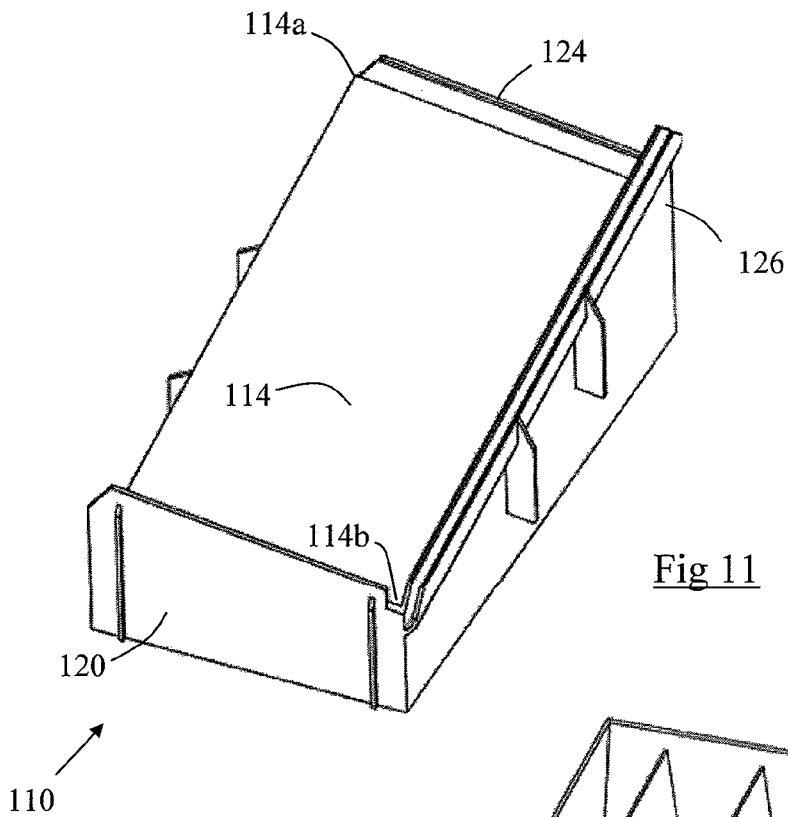
FIG. 11 is a perspective diagram of a media cassette loader in the form of a currency cassette loader according to a second embodiment of the present invention.

Reference will now be made to FIG. 11, which is a perspective diagram of a media cassette loader in the form of a currency cassette loader 110 according to a second embodiment of the present invention.

In the currency cassette loader 110, a banknote loading surface 114 is inclined in two planes from a high position at one diagonal point 114a to a low position at the opposite diagonal point 114b. The other parts of the currency cassette loader 110 (for example, the lower end wall 120, upper end wall 124, and first side-wall 126) are very similar to the corresponding parts of the currency cassette loader 10. The operation of the alternative currency cassette loader 110 is identical to that of the currency cassette loader 10.

Figure 12:
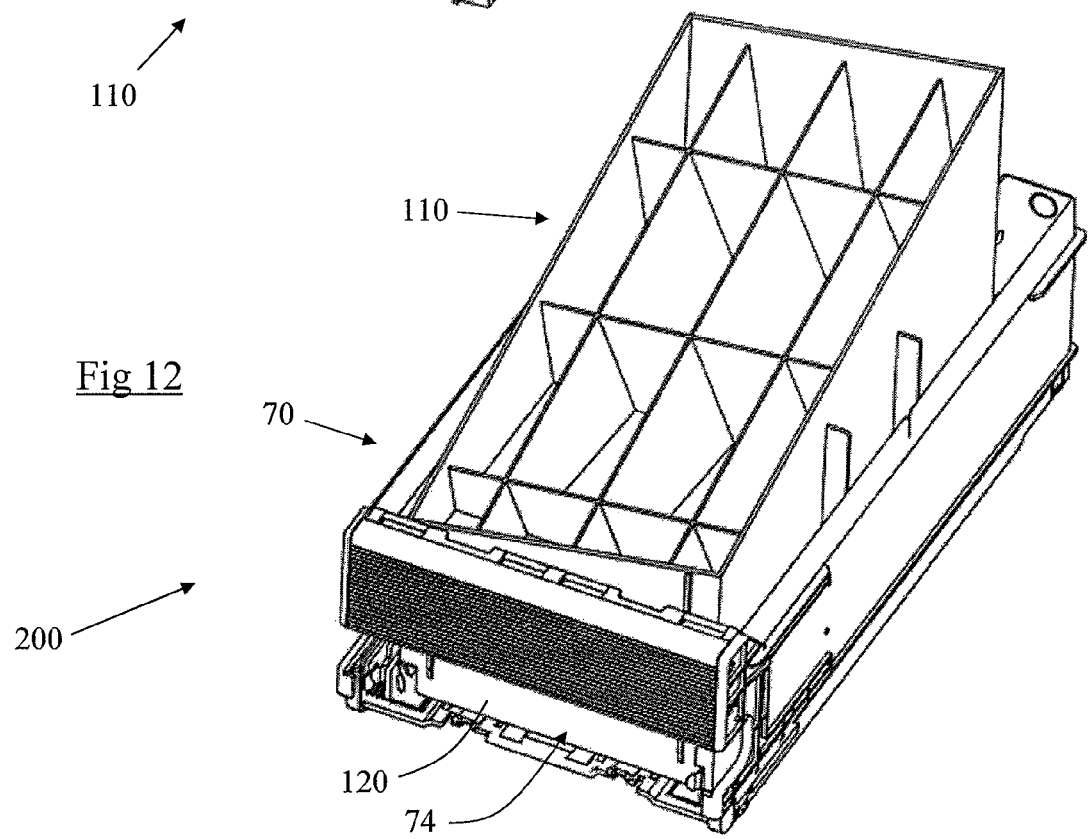
FIG. 12 is a perspective diagram illustrating the currency cassette body portion of FIG. 4 partially enclosing the alternative cassette loader of FIG. 11 to form a combined unit.

The currency cassette body portion 70 can be placed over the alternative currency cassette loader 110 (in a similar manner to the currency cassette loader 10) to form a combined unit 200, which can then be rotated by one hundred and eighty degrees to the position illustrated in FIG. 12.

The alternative currency cassette loader 110 can then be removed to leave a replenished currency cassette body portion 70.

Various modifications may be made to the above described embodiments within the scope of the invention, for example, in other embodiments the media items may be stamps, coupons, tickets, or the like.

Although replenishment is described above as a manual operation, a machine could be provided that automatically stacks the loading surface, places the media cassette over the loading surface, rotates the combined unit, then removes the loader.

In other embodiments, the banknote loading surface may be inclined at a different angle to that described above (either steeper or less steep).

In other embodiments, the dimensions of the currency cassette body portion 70 and the banknote cassette loader 10 may be different to those described above. In particular, the dimensions of the banknote cassette loader 10 described above were selected for use with U.S. currency in a standard currency cassette sold by NCR Corporation, Duluth, Ga., U.S.A. In other embodiments, the dimensions of a media cassette loader may be selected to match a different currency (or other type of media item) and/or a currency cassette (or other type of cassette) provided by a different vendor to NCR Corporation.

In the above embodiments, the currency cassette loader 10 is a unitary injection-molded part; whereas, in other embodiments, the currency cassette loader 10 may be made of any convenient material, such as metal (such as aluminum), wood, a plastics material (such as polycarbonate), or the like, and may be made by any convenient fabrication process.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

What is claimed is:

1. A media cassette loader for assisting a replenisher to load media items into a media cassette having a cassette body which can be placed over the media cassette loader, the media cassette loader comprising:
a base having (i) a first major side surface portion, (ii) a second major side surface portion which is opposite the first major side surface portion, (iii) a first side wall portion which extends transverse to the first and second major side surface portions, and (iv) a second side wall portion which extends transverse to the first and second major side surface portions and substantially parallel to the first side wall portion;
a media loading surface disposed on the first major side surface portion and on which media items to be loaded into the media cassette can be stacked before the media cassette body is placed over the media cassette loader, wherein the media loading surface is inclined at an angle to the first major side surface portion;
a first support handle disposed on the first side wall portion of the media cassette loader; and
a second support handle disposed on the second side wall portion of the media cassette loader, wherein the first and second support handles extend substantially parallel to the media loading surface and are located such that the first and second support handles abut to upper edges on longitudinal sides of the media cassette body when the media cassette body is placed over the media loading surface.

2. A media cassette loader according to claim 1, further comprising:
a first end wall upstanding from a lower end of the media loading surface to support media items stacked on the media loading surface, wherein the media loading surface and the first end wall are dimensioned to be accommodated within a media cassette body.

3. A media cassette loader according to claim 2, wherein a side-wall of the first side wall portion upstands from the media loading surface and includes an upper portion parallel to the media loading surface so that the distance between the media loading surface and the top of the upper portion is constant along the entire length of the media loading surface.

4. A media cassette loader according to claim 3, wherein the upper portion is dimensioned to locate between the sidewall of the media cassette body and a media width guide within the media cassette body.

5. A media cassette loader according to claim 3, wherein the media cassette loader is (i) open above the media loading surface on an opposing side to the side-wall, and (ii) open above the media loading surface in a plane parallel with the media loading surface.

6. A media cassette loader according to claim 2, wherein the first end wall is disposed at an acute angle to the media loading surface.

7. A media cassette loader according to claim 2, further comprising:
a second end wall opposite the first end wall.

8. A media cassette loader according to claim 7, wherein the second end wall is relatively low compared with the first end wall.

9. A media cassette loader according to claim 2, wherein the media loading surface and the first end wall are dimensioned so that even if the media loader is overstuffed with media items, a sufficient gap is provided within the cassette body so that the overstuffing condition is reduced or obviated once the media cassette loader is removed.

10. A media cassette loader according to claim 1, wherein the media loading surface defines a central groove extending longitudinally therealong so that media items are located transversely to the central groove as they are stacked on the media loading surface.

11. A media cassette loader for assisting a replenisher to load media items into a media cassette having a cassette body which can be placed over the media cassette loader, the media cassette loader comprising:
a base having a first major side surface portion and a second major side surface portion which is opposite the first major side surface portion;
a media loading surface disposed on the first major side surface portion and on which media items to be loaded into the media cassette can be stacked before the media cassette body is placed over the media cassette loader, wherein the media loading surface is inclined at an angle to the first major side surface portion;
at least one internal lateral wall portion disposed on the second major side surface portion and extending transverse to the second major side surface portion;
at least one internal longitudinal wall portion disposed on the second major side surface portion and extending transverse to both the at least one internal lateral wall portion and the second major side surface portion of the base to provide rigidity to the media cassette loader;
(i) the at least one internal lateral wall portion includes at least two internal lateral wall portions disposed on the second major side surface portion and extending transverse to the second major side surface portion;
(ii) the at least one internal longitudinal wall portion includes at least two internal longitudinal wall portions disposed on the second major side surface portion and extending transverse to both the at least two internal lateral wall portions and the second major side surface portion of the base to provide rigidity to the media cassette loader; and
a removal longitudinal handle for enabling a replenisher to remove the media cassette loader from the cassette body of the media cassette after the cassette body has been placed over a stack of media items on the media cassette loader to surround the stack of media items and the combined unit of the media cassette loader and the media cassette has been rotated to a position which allows the replenisher to remove the media cassette loader from the cassette body of the media cassette and thereby to transfer the stack of media items from the media cassette loader to the media cassette, wherein the removable longitudinal handle extends transverse between the at least two internal lateral wall portions and extends substantially parallel to the at least two internal longitudinal wall portions.

12. A media cassette loader according to claim 11, further comprising:
A first support handle disposed on a first side wall portion of the media cassette loader; and
A second support handle disposed on an opposite second side wall portion of the media cassette loader, wherein the first and second support handles extend substantially parallel to the media loading surface and are located such that the first and second support handles abut to upper edges on longitudinal sides of the media cassette body when the media cassette body is placed over the media loading surface.

13. A media cassette loader for assisting a replenisher to load media items into a media cassette having a cassette body which can be placed over the media cassette loader, the media cassette loader comprising:
- a base having a first major side surface portion and a second major side surface portion which is opposite the first major side surface portion;
- a substantially rectangular media loading surface disposed on the first major side surface portion and on which media items to be loaded into the media cassette can be stacked before the media cassette body is placed over the media cassette loader, wherein the substantially rectangular media loading surface is inclined in two planes from a high position at one diagonal point on the substantially rectangular media loading surface to a low position at an opposite diagonal point on the substantially rectangular media loading surface;
- at least one lateral wall portion disposed on the second major side surface portion and extending transverse to the second major side surface portion;
- at least one longitudinal wall portion disposed on the second major side surface portion and extending transverse to both the at least one lateral wall portion and the second major side surface portion of the base to provide rigidity to the media cassette loader;
- (i) the at least one lateral wall portion includes at least two lateral wall portions disposed on the second major side surface portion and extending transverse to the second major side surface portion; and
- (ii) the at least one longitudinal wall portion includes at least two longitudinal wall portions disposed on the second major side surface portion and extending transverse to both the at least two lateral wall portions and the second major side surface portion of the base to provide rigidity to the media cassette loader; and
- a removal longitudinal handle for enabling a replenisher to remove the media cassette loader from the cassette body of the media cassette after the cassette body has been placed over a stack of media items on the media cassette loader to surround the stack of media items and the combined unit of the media cassette loader and the media cassette has been rotated to a position which allows the replenisher to remove the media cassette loader from the cassette body of the media cassette and thereby to transfer the stack of media items from the media cassette loader to the media cassette, wherein the removable longitudinal handle extends transverse between the at least two lateral wall portions and extends substantially parallel to the at least two longitudinal wall portions.

14. A media cassette loader according to claim 13, further comprising:
- a first support handle disposed on a first side wall portion of the media cassette loader; and
- a second support handle disposed on an opposite second side wall portion of the media cassette loader, wherein the first and second support handles extend substantially parallel to the media loading surface and are located such that the first and second support handles abut to upper edges on longitudinal sides of the media cassette body when a media cassette body is placed over the media loading surface.

* * * * *